United States Patent [19]
Casais

[11] Patent Number: 5,456,993
[45] Date of Patent: Oct. 10, 1995

[54] UPPER CAP FOR ELECTRICAL ACCUMULATORS

[76] Inventor: Osvaldo B. Casais, 3260 Andonaegui St. (1431), Buenos Aires City, Argentina

[21] Appl. No.: 179,198

[22] Filed: Jan. 10, 1994

[30]     Foreign Application Priority Data

Apr. 16, 1993 [AR] Argentina ................................. 324.769

[51] Int. Cl.⁶ .................................................. H01M 2/10
[52] U.S. Cl. ............................................. 429/65; 429/187
[58] Field of Search ................................. 429/177, 187, 429/65

[56]           References Cited

U.S. PATENT DOCUMENTS

| | | | |
|---|---|---|---|
| 3,910,800 | 10/1975 | Groby et al. ............................. | 429/187 |
| 4,042,762 | 8/1977 | Hakarine ................................... | 429/187 |
| 4,698,459 | 10/1987 | Drake ....................................... | 429/65 X |
| 4,727,620 | 3/1988 | Gummelt ............................. | 429/187 X |
| 5,169,338 | 12/1992 | Dewar et al. .......................... | 429/65 X |
| 5,236,792 | 8/1993 | Larkin et al. ........................ | 429/187 X |

*Primary Examiner*—Stephen Kalafut
*Attorney, Agent, or Firm*—Michael D. Bednarek; Marks & Murase

[57]                 ABSTRACT

Upper cap for electrical accumulators useful either for stationary or movable applications in automobiles, ships and general vehicles, the accumulator including a positive and a negative terminal pins, the cap comprising an upper surface including a central strip having two opposite side edges on which two respective flappers are connected, each flapper having an outer edge and an inner edge and at least one through opening located close to the outer edge, the inner edge being connected to a respective side edge of the central strip through a hinge-connection, whereby the flappers may be positioned in a folded position wherein the flappers upwardly extend relative to the upper surface of the cap so that the openings remain adjacent one to the other to define a handle for taking and carrying the accumulator.

16 Claims, 2 Drawing Sheets

UPPER CAP FOR ELECTRICAL ACCUMULATORS

BACKGROUND OF THE INVENTION

1. Field of the Invention

The present invention relates to an upper cap for electrical accumulators, the accumulators being either used in stationary or movable stations like houses, automobiles, ships, planes and general vehicles. The invention particularly relates to a closing cap for accumulators, the cap allowing a person to take and carry the accumulator easily. The accumulators being of the type requiring maintenance or not, in the case of maintenance the cap including ports for replenishing electrolyte and, in the case of no maintenace required the cap totally seals the accumulator.

2. Description of the Prior Art

The conventional batteries or electrical accumulators comprise a container box housing metal plates and an electrolyte. This box has an upper opening sealed by a closing cap. The cap includes electrical terminal pins, positive and negative pins, through which the electrical power is taken. There are batteries that require maintenance in which case the electrolyte must be periodically replenished, therefore the cap must include access ports for replenishing purposes. These ports are generally closed by sealing plugs, threaded in necks of the ports so that the plugs may be removed and then, after replenishing, inserted again in the ports.

There is another type of accumulators which do not require maintenance, therefore the accumulator box is totally closed by the upper cap in a tightly manner. In this case the upper cap has not access ports.

With any one of the above accumulator types it is frequently neccesary to remove the accumulator from the place wherein it is installed, either for maintenance, service or cleaning purposes or merely for replacing an old accumulator by a new one. In any of these situations the accumulator must be firmly taken and safely carried, however the heavy weight of the accumulator and the dangerous electrolyte it contains make the handling and carrying of the acccumulator very perilous. Because the conventional accumulators do not have effective handling means both hands are generally neccesary to take, lift and carry them.

The above drawbacks become of a very importance when the accumulator is for automobiles, in this case the accumulator is installed in a small, generally unaccessible space, full of mechanical parts, wires and cables, grease, etc. These causes the reaching, taking and lifting of the accumulator with both hands to be cumbersome.

Due to the above explained disadvantages the automobile manufacturers are requiring to the accumulator manufacturers that the accumulators be provided with adequate handling means to facilitate the handling and safe carrying of these products either in benefit of the users as well as of the car assembling line operators.

SUMMARY OF THE INVENTION

It is therefore an object of the invention to provide new handle means for accumulators whereby an accumulator can be easily and firmly held and carried with only one hand. In a preferred embodiment of the invention the cap includes foldable flappers hinged to an upper surface of the cap, the flappers forming a handle to be firmly taken by a hand of a person.

More specifically the invention provides an upper cap for electrical accumulators for stationary or movable applications in automobiles, ships and general vehicles, the accumulator including a positive and a negative terminal pins, the cap comprising an upper surface and at least two foldable flappers, each flapper having an outer edge and an inner edge, the inner edge being hinged to the upper surface, whereby the flappers may be positioned in a folded position wherein the flappers upwardly extend relative to the upper surface of the cap and an unfolded position wherein the flappers extend substantially in a plane with the upper surface of the cap, each flapper including at least one through opening located close to the outer edge thereof, whereby when both flappers are in the folded position both openings thereof are adjacent one to the other to define a handle for taking and carrying the accumulator.

Even more specifically, an object of the invention is to provide an upper cap for electrical accumulators, wherein the upper surface includes a central strip extending along an upper mean zone of the cap, the strip having opposite side edges on which respective flappers are connected, the inner edge of each flapper being hinged to a respective side edge of the central strip.

Central strip means that the strip is located between side walls or end walls of the cap without being neccesary that the strip be located exactly at the center of the upper surface of the cap. In any case this will depend on the weights distribution of the accumulator so that it can be carried in a substantially horizontal and balanced condition.

The above and other objects, features and advantages of this invention will be better understood when taken in connection with the accompanying drawings and description.

BRIEF DESCRIPTION OF THE DRAWINGS

The present invention is illustrated by way of example in the following drawings wherein.

DESCRIPTION OF THE PREFERRED EMBODIMENTS

Figure 1:
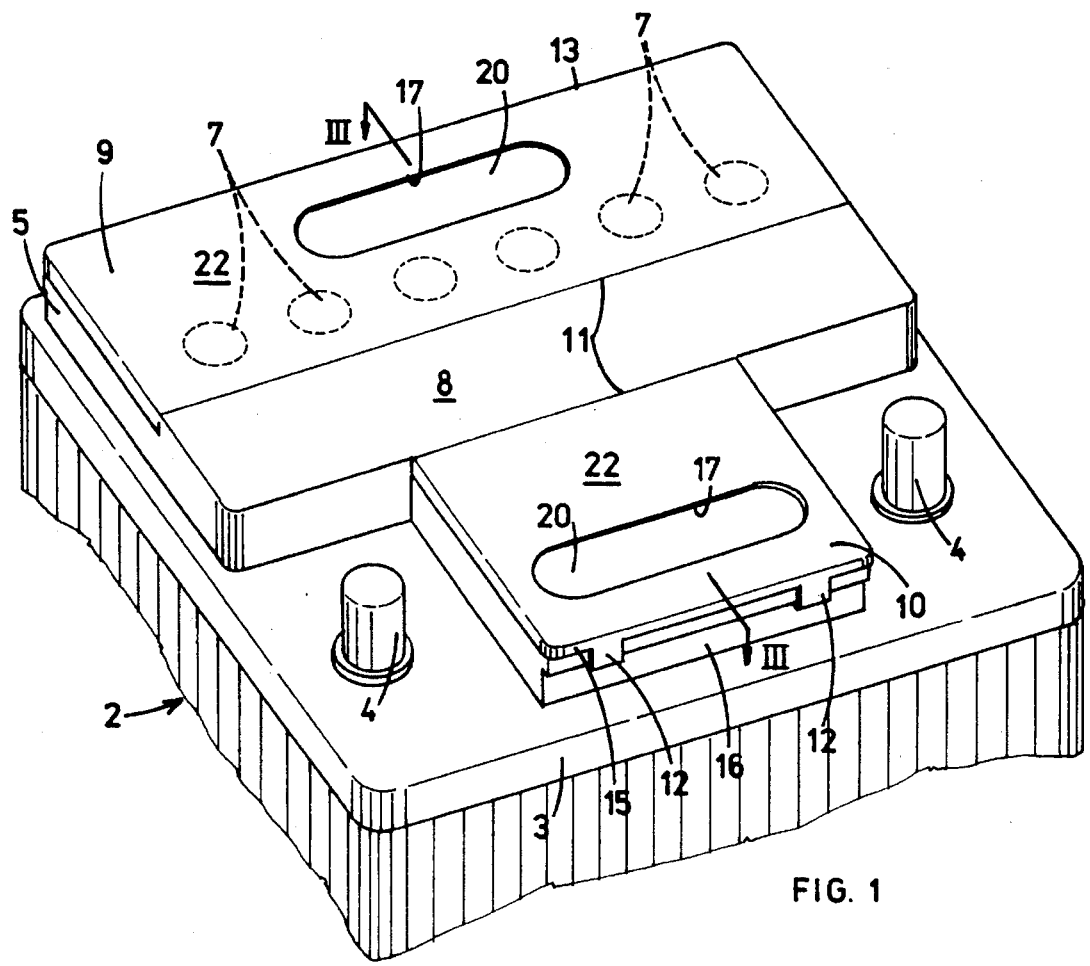
FIG. 1 is a top perspective view of the cap of the invention in an accumulator shown in phantom lines, with the flappers in the unfolded position.
Figure 2:
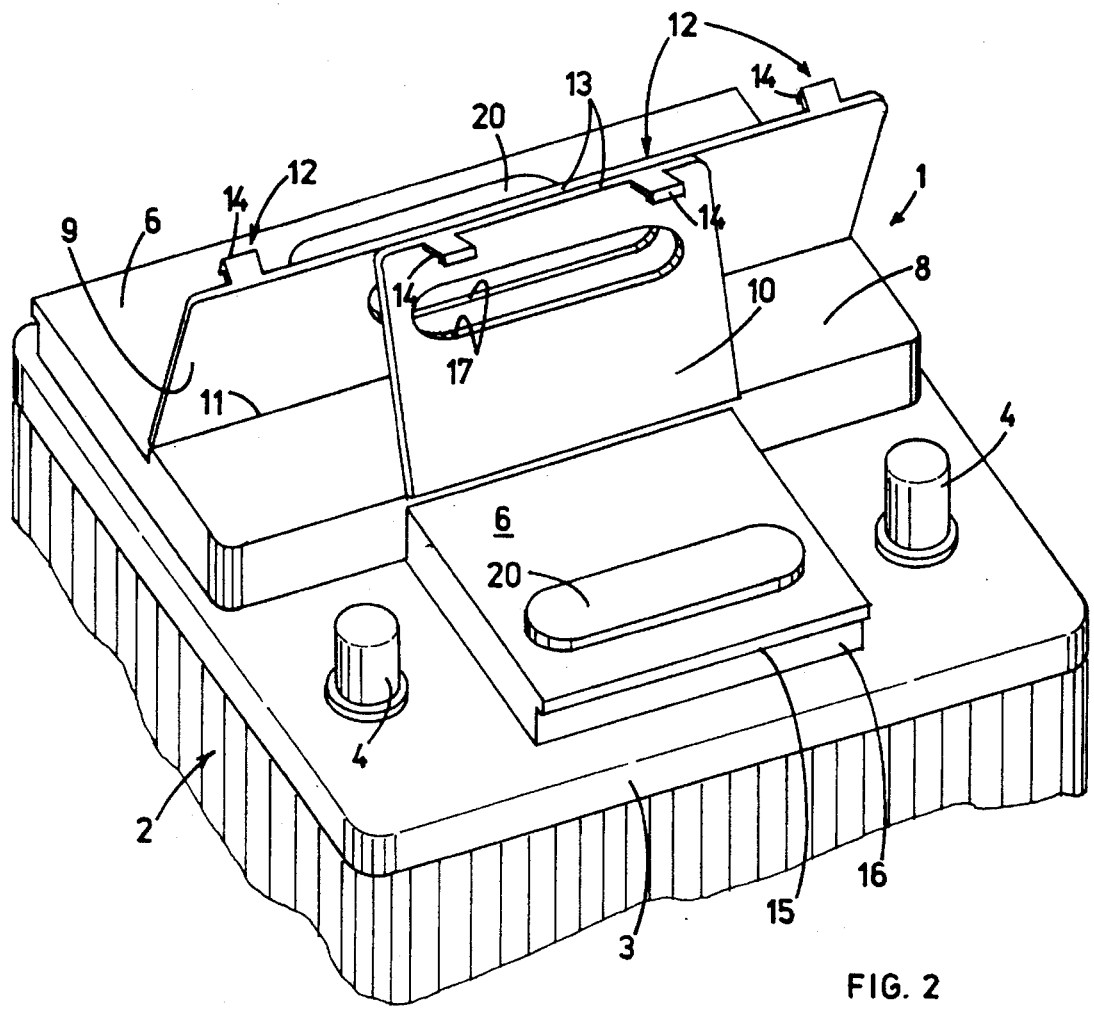
FIG. 2 is a top perspective view of the cap of the invention in an accumulator shown in phantom lines, with the flappers in the folded position.

FIGS. 1 and 2 shows an accumulator 1 comprising a container box 2 for housing conventional plates and an electolyte, box 2 being closed by an upper cap 3. Cap 3 may be a substantially flat cap from which negative and positive electrical terminal pins upwardly extend. Cap 3 may also have an upwardly projected part 5 but in all cases the cap will comprise an upper surface 6 (see FIG. 2).

Cap 3 may be of the type for accumulators that require maintenance or not, if the accumulator is one of the maintained type, surface 6 includes access ports 7 shown in phantom lines, for replenishing the neccesary electrolyte. These ports will have their respective closing plugs not shown. In the case of a not maintained accumulator, surface 6 has no ports and completely seals the container box 2.

In accordance with the invention a central strip 8 is provided onto upper surface 6, strip 8 extending along an upper mean zone of surface 6, say along a mean vertical plane of the accumulator. Strip 8 includes opposite side edges 11 and two flappers 9, 10 are provided, each one at each side of strip 8. Flappers 9, 10 have outer edges 13 and inner edges 21 hinged to side edges 11 of strip 8, whereby the flappers may be positioned in a folded position shown in FIG. 2, wherein the flappers upwardly extend relative to upper surface 6 of the cap and an unfolded position shown in FIG. 1 wherein flappers 9, 10 extend substantially in a plane with upper surface 6 of the cap. The expresion substantially in a plane means that flappers 9, 10 remain adjacent and as close as possible to surface 6 and even outer surfaces 22 of the flappers may be contained in the same plane of surface 6.

When in the unfolded position, flappers 9, 10 horizontally extend on surface 6; if surface 6 includes ports 7 these ports and their plugs will be covered by flapper 9 as shown in FIG. 1. To remain in the unfolded position flappers 9, 10 include locking means 12 comprising at least one skirt 14 projecting from outer edge 13 of the respective flapper and is capable of locking against a step 15 formed in a side wall 16 of cap 3.

Alternatively, locking means 12 may comprise pins extending either upwardly from surface 6 or douwnwardly from the flappers to lock within orifices respectively provided in the flappers or in surface 6.

As it is clearly shown in FIG. 2, each flapper 9, 10 includes at least one through opening 17 located close to outer edge 13, whereby when both flappers are folded into an upwardly extended position they adopt, togheter with strip 8, a triangular configuration wherein edges 13 are one resting on the other and both openings 17 are adjacent one to the other to define handle means for taking and carrying the accumulator.

Openings 17 may have a plurality of shapes always adequate to facilitate handling of the accumulator, for example opening 17 may be an elongated opening for passing the fingers of a human hand. Alternatively, the at least one opening of each flapper may comprise four aligned openings, each opening for each one of four fingers of a human hand.

Locking means 12 may also comprise the combination of openings 17 an respective projections 20 capable of snuggly entering openings 17 so that flappers 9, 10 are retained in the unfolded position of FIG. 1.

Flappers can be directly hinged to upper surface 6 by means of any appropriate hinge means and strip 8 may form part of surface 6. In a preferred embodiment of the invention, however, strip 8 and flappers 9, 10 form an only one laminar plastic piece, preferably made of polypropylene, and the hinge connection between side edges 11 of strip 8 and inner edges 21 of flappers 9, 10 is formed by a weakened line 19, that is a longitudinal recess shown in FIG. 3 which works like a hinge allowing the flapper to be repeatedly folded and unfolded.

Figure 3:
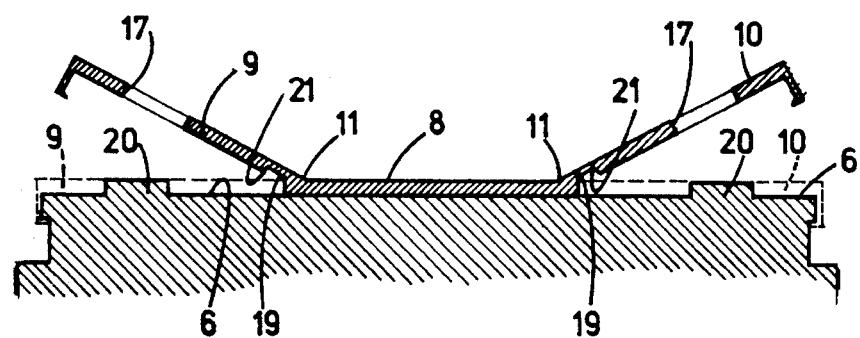
FIG. 3 is a cross section taken along line III—III of FIG. 1.

When strip 8 and flappers 9, 10 form one laminar piece, strip 8 can be bonded to surface 6 by any adhesive or welded by heat. FIG. 3 shows strip 8 bonded to surface 6 and weakened lines 19 are also clearly illustrated.

Figure 4:
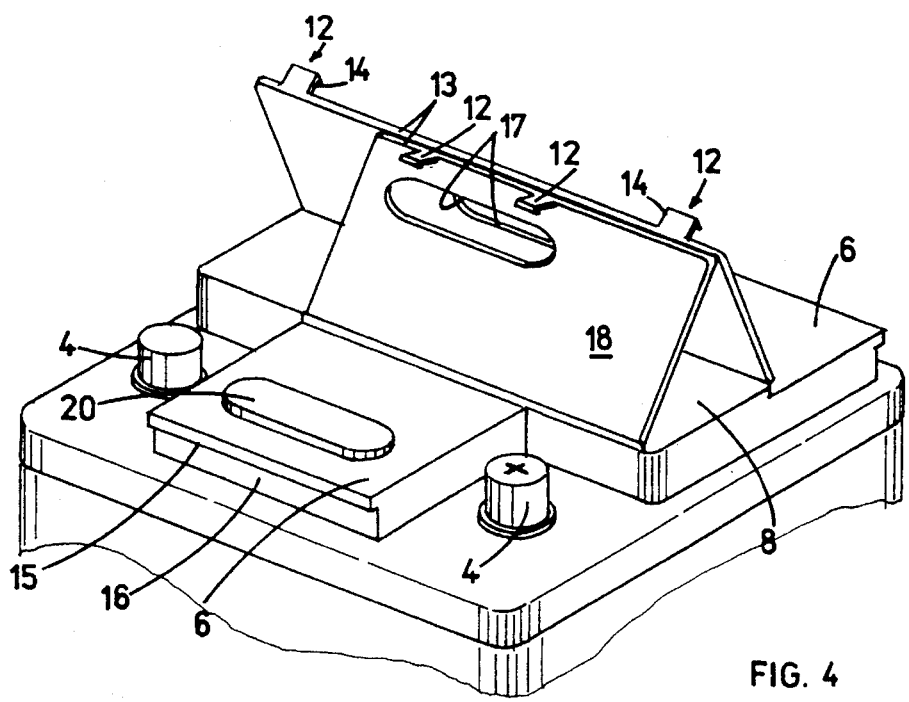
FIG. 4 is a view similar to FIG. 2 showing a second embodiment of the cap of the invention.

Finally, FIG. 4 shows an alternative embodiment wherein the flapper located at the side of the cap having terminal pins 4 is extended to form a safety cover 18 for covering the positive one of the pins, indicated with the positive sign. This very important particularly in the event of an automobile collision wherein a metal part of the car may enter into contact with the positive terminal pin and cause fire.

Flappers have been illustrated as being parallel to side walls of box 2, however flappers 9, 10 may be positoned at 90 degrees relative to the illustrated position, that is parallel to end walls of box 2.

While preferred embodiments of the present invention have been illustrated and described, it will be obvious to those skilled in the art that various changes and modifications may be made therein without departing from the scope of the invention as defined in the appended claims.

I claim:

1. Upper cap for electrical accumulators for stationary or movable applications in houses and vehicles, the accumulator including a positive and a negative terminal pins, the cap comprising an upper surface and at least two foldable flappers, each flapper having an outer edge and an inner edge, the inner edges being hinged to the cap, whereby the flappers may be positioned in a folded position wherein the flappers upwardly extend relative to the upper surface of the cap and an unfolded position wherein the flappers extend substantially in a plane with the upper surface of the cap, each flapper including at least one through opening through which fingers may pass, the opening being located close to the outer edge thereof, whereby when both flappers are in the folded position both openings thereof are adjacent one to the other to define a handle for taking and carrying the accumulator, the upper surface of the cap comprising locking means including at least a pair of upwardly extending projections in the upper surface, the projections being located in positions whereby when the flappers are in the unfolded position each projection snugly fits into the opening of the associated flapper, occupying the entire opening and being level with outer surfaces of the flappers.

2. Upper cap for electrical accumulators according to claim 1, wherein the upper surface includes a central strip having opposite side edges on which respective flappers are connected, the inner edge of each flapper being hinged to a respective side edge of the central strip.

3. Upper cap for electrical accumulators according to claim 2, wherein the locking means further comprise at least one skirt projecting from each outer edge of the flappers, the skirt being capable of resiliently snapping on a locking step formed in an associated side wall of the cap to retain the flappers in the unfolded position.

4. Upper cap for electrical accumulators according to claim 1, wherein the flappers form part of an integral laminar piece, the flappers being spaced apart by a central strip of the piece, the flappers being connected to the piece by respective weakened lines in the laminar piece.

5. Upper cap for electrical accumulators according to claim 4, wherein the laminar piece is made of plastics.

6. Upper cap for electrical accumulators according to claim 4, wherein the strip is bonded with adhesive to the cap.

7. Upper cap for electrical accumulators according to claim 5, wherein the strip is welded by heat to the cap.

8. Upper cap for electrical accumulators according to claim 2, wherein the strip has two opposite side edges and one flapper is connected to each side edge.

9. Upper cap for electrical accumulators according to claim 8, wherein one of the flappers has a portion forming a safety cover for covering at least the positive terminal pin in the unfolded position.

10. Upper cap for electrical accumulators according to claim 9, wherein the cap has a plurality of ports for replenishing electrolyte and the other one flapper covers the ports in the unfolded position.

11. Upper cap for electrical accumulators according to claim 8, wherein the flappers have same width.

12. Upper cap for electrical accumulators according to claim 5, wherein the plastic material is polypropylene.

13. Upper cap for electrical accumulators according to claim 1, wherein the at least one opening of each flapper is one elongated opening for passing the fingers of a human hand.

14. Electrical accumulator for stationary and/or movable applications in houses, automobiles, ships, and planes, the accumulator comprising a container box housing electrical elements and electrolyte, the box having an upper cap and a positive and a negative terminal pins, the cap comprising an upper surface including a central strip having opposite side edges on which respective flappers are connected, each flapper having an outer edge and an inner edge, the inner edge being connected to a respective side edge of the central strip through a hinge-connection, whereby the flappers may be positioned in a folded position wherein the flappers upwardly extend relative to the upper surface of the cap and an unfolded position wherein the flappers extend substantially in a plane with the upper surface of the cap, each flapper including at least one through opening through which fingers may pass, the opening being located close to the outer edge thereof, whereby when both flappers are in the folded position both openings thereof are adjacent one to the other to define a handle for taking and carrying the accumulator, the upper surface of the cap comprising locking means including at least a pair of upwardly extending projections in the upper surface, the projections being located in positions whereby when the flappers are in the unfolded position each projection snugly fits into the opening of the associated flapper, occupying the entire opening and being level with outer surfaces of the flapper.

15. Electrical accumulators according to claim 14, wherein the strip and the flappers comprise an integral laminar piece, the strip being firmly affixed to the cap, the side edges of the strip being parallel and formed by respective weakened lines in the laminar piece.

16. Electrical accumulators according to claim 15, wherein the laminar piece is made of plastics.

\* \* \* \* \*